(12) United States Patent
Chen et al.

(10) Patent No.: US 8,120,340 B2
(45) Date of Patent: Feb. 21, 2012

(54) CONTROL DEVICE FOR AN INTERLEAVING POWER FACTOR CORRECTOR

(75) Inventors: Dan Chen, Taipei (TW); Chung-Ping Ku, Yangmei Township (TW); Chih-Yuan Liu, Banqiao (TW); Hsien-Yi Tsai, Jiali Township (TW)

(73) Assignee: National Taiwan University, Taipei (TW)

( * ) Notice: Subject to any disclaimer, the term of this patent is extended or adjusted under 35 U.S.C. 154(b) by 393 days.

(21) Appl. No.: 12/543,660

(22) Filed: Aug. 19, 2009

(65) Prior Publication Data

US 2011/0043177 A1 Feb. 24, 2011

(51) Int. Cl.
*G05F 1/59* (2006.01)
(52) U.S. Cl. ........................................................ 323/272
(58) Field of Classification Search .................. 323/272, 323/282, 283, 288; 363/40, 41, 65, 71, 72
See application file for complete search history.

(56) References Cited

U.S. PATENT DOCUMENTS

| 7,729,140 B2* | 6/2010 | Ying et al. ....................... 363/41 |
| 7,880,453 B2* | 2/2011 | Koo et al. ...................... 323/283 |
| 7,884,588 B2* | 2/2011 | Adragna et al. .............. 323/272 |

FOREIGN PATENT DOCUMENTS

JP 2010016234 A * 1/2010

* cited by examiner

*Primary Examiner* — Adolf Berhane
(74) *Attorney, Agent, or Firm* — Occhiuti Rohlicek & Tsao LLP (57) ABSTRACT

In an interleaving power factor corrector, a control device interleavingly drives first and second converting circuits such that the power factor corrector generates a voltage output (Vo), and includes first and second control modules generating respectively first and second driving signals (Q_master, Q_slave) that correspond respectively to first and second control signals for controlling operations of power switches of the first and second converting circuits. A phase modulating module generates a reset signal (S_PTCL) based on an inverted first driving signal (Qn_master) and a feedback compensation signal (Vcomp) outputted by the first control module, and a reset signal (S_syn) outputted by the second control module. When one of the reset signals (S_syn, S_PTCL) has a predetermined level, the second driving signal (Q_slave) has a level for switching the power switch of the second converting circuit to an OFF-mode.

18 Claims, 10 Drawing Sheets

CONTROL DEVICE FOR AN INTERLEAVING POWER FACTOR CORRECTOR

BACKGROUND OF THE INVENTION

1. Field of the Invention

The invention relates to a control device, more particularly to a control device for an interleaving power factor corrector.

2. Description of the Related Art

Figure 1:
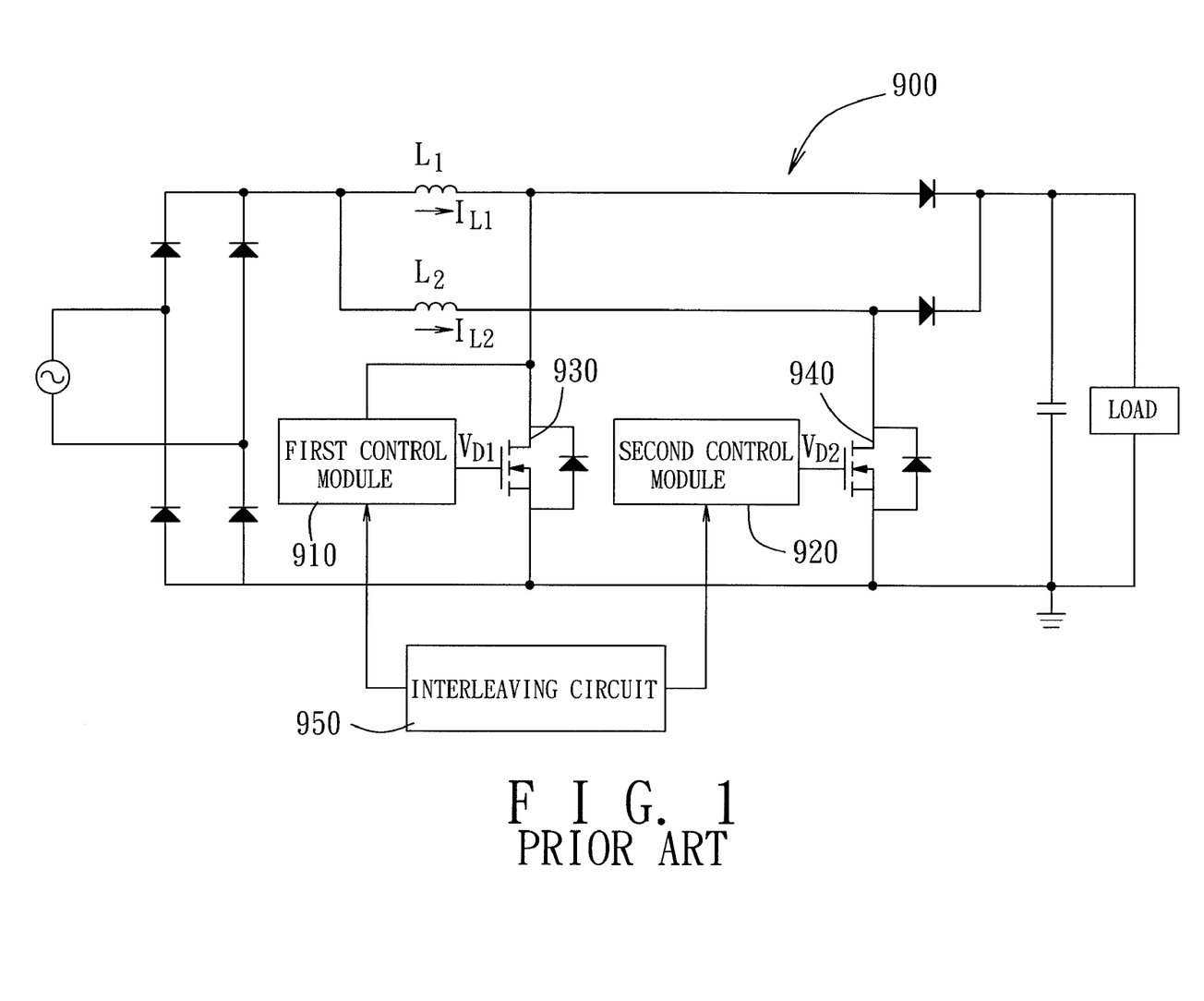
FIG. 1 is a schematic circuit block diagram illustrating a conventional interleaving power factor corrector.
Figure 2A:
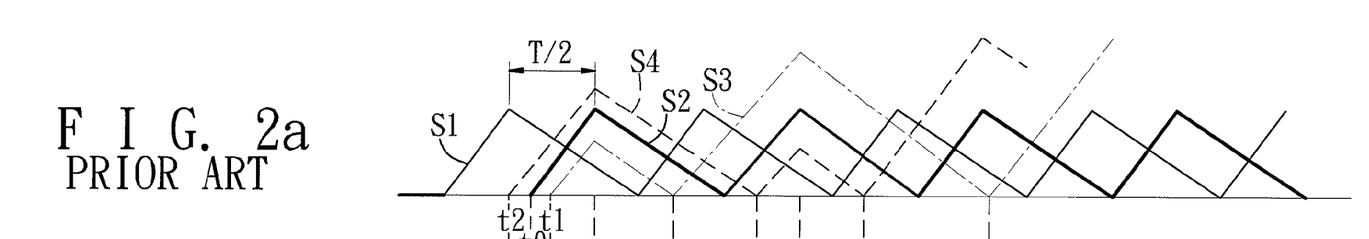
FIG. 2a illustrates waveforms of currents ($I_{L1}$, $I_{L2}$) flowing respectively through first and second inductors of the conventional interleaving power factor corrector, wherein S1 and S2 represent respectively the current ($I_{L1}$, $I_{L2}$) in an ideal condition, and S3 and S4 represent the current ($I_{L2}$) in non-ideal conditions.

Referring to FIG. 1, a conventional interleaving power factor corrector 900 is shown to include first and second control modules 910, 920, first and second power switches 930, 940, and an interleaving circuit 950. The first control module 910 outputs a first control signal ($V_{D1}$) based on a current ($I_{L1}$) flowing through an inductor ($L_1$) such that the first power switch 930 is operable between an ON-mode and an OFF-mode in response to the first control signal ($V_{D1}$) from the first control module 910. When the first control module 910 detects that the current ($I_{L1}$) is zero, the first control signal ($V_{D1}$) outputted by the first control module 910 has a high level such that the first power switch 930 is switched to the ON-mode. The second control module 920 outputs a second control signal ($V_{D2}$) based on a current ($I_{L2}$) flowing through an inductor ($L_2$) such that the second power switch 940 is operable between an ON-mode and an OFF-mode in response to the second control signal ($V_{D2}$) from the second control module 920. When the second control module 920 detects that the current ($I_{L2}$) is zero, the second control signal ($V_{D2}$) outputted by the second control module 920 has a high level such that the second power switch 930 is switched to the ON-mode. The first and second control modules 910, 920 are controlled by the interleaving circuit 950 so that the first and second control signals ($V_{D1}$, $V_{D2}$) outputted respectively thereby have a phase difference of T/2 therebetween, i.e., 180°, where T is a cycle period of the current ($I_{L1}$), as shown in FIG. 2a.

Figure 2B:
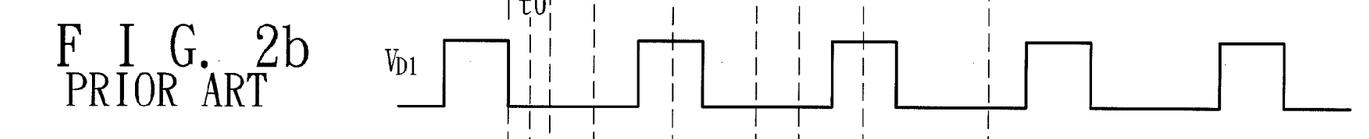
Figure 2C:
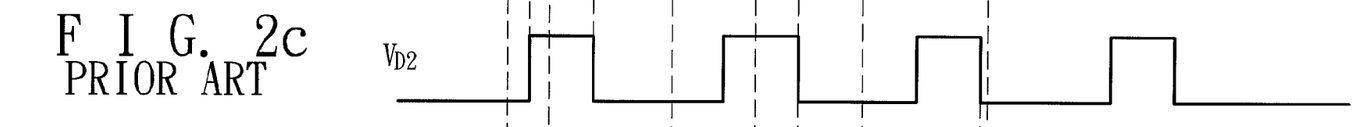
Figure 2D:
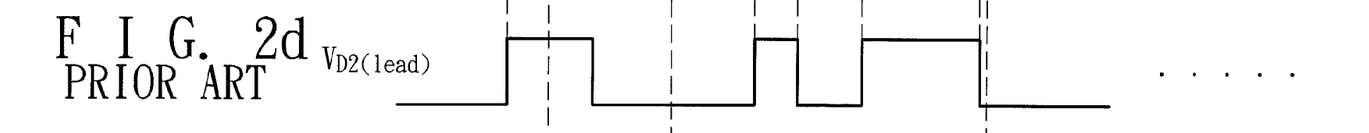
Figure 2E:
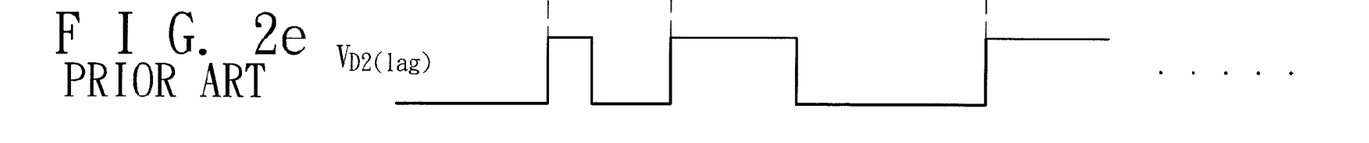

Referring to FIGS. 2a to 2e, FIG. 2a illustrates waveforms of the currents ($I_{L1}$, $I_{L2}$), wherein S1 and S2 represent respectively the current ($I_{L1}$, $I_{L2}$) in an ideal condition, S3 represents the current ($I_{L2}$) having a lead zero point, and S4 represent the current ($I_{L2}$) having a lag zero point. FIG. 2b illustrates a waveform of the first control signal ($V_{D1}$) corresponding to S1 of FIG. 2a. FIG. 2c illustrates a waveform of the second control signal ($V_{D2}$) corresponding to S2 of FIG. 2a. FIGS. 2d and 2e illustrate waveforms of the second control signal ($V_{D2}$) corresponding respectively to S3 and S4 of FIG. 2a. S1 of FIG. 2a indicates that the current ($I_{L2}$) has a zero point at t0 in the ideal condition. However, the zero point of the current ($I_{L2}$) may drift as a result of external interference. For example, S3 of FIG. 2a indicates that the current ($I_{L2}$) has a lead zero point at t2, and S4 of FIG. 2a indicates that the current ($I_{L2}$) has a lag zero point at t1. Therefore, drift of the zero point of the current ($I_{L2}$) incurs apparent variation of the duty cycle of the second control signal ($V_{D2}$), as shown in FIG. 2d, or the diverged duty cycle of the second control signal ($V_{D2}$), as shown in Figure and 2e. Therefore, the conventional interleaving power factor corrector 900 cannot provide a stable voltage output to the load.

SUMMARY OF THE INVENTION

Therefore, an object of the present invention is to provide a control device for an interleaving power factor corrector that can overcome the aforesaid drawbacks of the prior art.

According to one aspect of the present invention, there is provided a control device for interleavingly driving first and second converting circuits of an interleaving power factor corrector such that the interleaving power factor corrector generates a voltage output (Vo). Each of the first and second converting circuits includes a combination of an inductor and a power switch. The power switches of the first and second converting circuits have control ends for receiving respectively first and second control signals such that the power switch of each of the first and second converting circuits is operable between an ON-mode and an OFF-mode in response to a corresponding one of the first and second control signals. The control device comprises:

a first control module adapted for detecting a current flowing through the inductor of the first converting circuit, outputting a feedback compensation signal (Vcomp) based on the voltage output (Vo) generated by the interleaving power factor corrector, and generating a first driving signal (Q_master) corresponding to the first control signal based on a result of current detection performed thereby and the feedback compensation signal (Vcomp), the first control module further outputting an inverted first driving signal (Qn_master);

a second control module adapted for detecting a current flowing through the inductor of the second converting circuit, receiving the inverted first driving signal (Qn_master) from the first control module, outputting a first reset signal (S_syn) based on the inverted first driving signal (Qn_master) received thereby, and generating a second driving signal (Q_slave) corresponding to the second control signal based on a result of current detection performed thereby, the first reset signal (S_syn) and a second reset signal (S_PTCL), the second control module further outputting an inverted second driving signal (Qn_slave); and a phase modulating module including
a reference signal generator coupled to the first and second control modules, receiving the inverted first driving signal (Qn_master) and the feedback compensation signal (Vcomp) from the first control module, and the first reset signal (S_syn) from the second control module, and generating a reference signal (Sref) based on the inverted first driving signal (Qn_master), the feedback compensation signal (Vcomp) and the first reset signal (S_syn) received thereby, a ramp generator coupled to the second control module, receiving the inverted second driving signal (Qn_slave) from the second control module, and generating a first ramp signal (Sramp1) based on the inverted second driving signal (Qn_slave) received thereby, and a comparator unit coupled to the reference signal generator and the ramp generator for receiving respectively the reference signal (Sref) and the first ramp signal (Sramp1) therefrom, comparing the reference signal (Sref) and the first ramp signal (Sramp1) received thereby, and outputting the second reset signal (S_PTCL) that has a predetermined level when a level of the first ramp signal (Sramp1) is greater than that of the reference signal (Sref);

When one of the first and second reset signals (S_syn, S_PTCL) has the predetermined level, the second driving signal (Q_slave) generated by the second control module has a level for switching the power switch of the second converting circuit to the OFF-mode.

According to another aspect of the present invention, an interleaving power factor corrector comprises:

first and second converting circuits each including a combination of an inductor and a power switch, the power switches of the first and second converting circuits having control ends for receiving respectively first and second control signals such that the power switch of each of the first and second converting circuits is operable between an ON-mode and an OFF-mode in response to a corresponding one of the first and second control signals; and a control device for interleavingly driving the first and second converting circuits such that the interleaving power factor corrector outputs a voltage output (Vo), the control device including a first control module coupled to the first converting circuit, detecting a current flowing through the inductor of the first converting circuit, outputting a feedback compensation signal (Vcomp) based on the voltage output (Vo), and generating a first driving signal (Q_master) corresponding to the first control signal based on a result of current detection performed thereby and the feedback compensation signal (Vcomp), the first control module further outputting an inverted first driving signal (Qn_master), a second control module coupled to the second converting circuit, detecting a current flowing through the inductor of the second converting circuit, receiving the inverted first driving signal (Qn_master) from the first control module, outputting a first reset signal (S_syn) based on the inverted first driving signal (Qn_master) from the first control module, and generating a second driving signal (Q_slave) corresponding to the second control signal based on a result of current detection performed thereby, the first reset signal (S_syn) and a second reset signal (S_PTCL), the second control module further outputting an inverted second driving signal (Qn_slave), and a phase modulating module including
a reference signal generator coupled to the first and second control modules, receiving the inverted first driving signal (Qn_master) and the feedback compensation signal (Vcomp) from the first control module, and the first reset signal (S_syn) from the second control module, and generating a reference signal (Sref) based on the inverted first driving signal (Qn_master), the feedback compensation signal (Vcomp) and the first reset signal (S_syn) received thereby, a ramp generator coupled to the second control module for receiving the inverted second driving signal (Qn_slave) therefrom, and generating a first ramp signal (Sramp1) based on the inverted second driving signal (Qn_slave) received thereby, and a comparator unit coupled to the reference signal generator and the ramp generator for receiving respectively the reference signal (Sref) and the first ramp signal (Sramp1) therefrom, comparing the reference signal (Sref) and the first ramp signal (Sramp1) received thereby, and outputting the second reset signal (S_PTCL) that has a predetermined level when a level of the first ramp signal (Sramp1) is greater than that of the reference signal (Sref).

When one of the first and second reset signals (S_syn, S_PTCL) has the predetermined level, the second driving signal (Q_slave) generated by the second control module has a level for switching the power switch of the second converting circuit to the OFF-mode.

BRIEF DESCRIPTION OF THE DRAWINGS

Other features and advantages of the present invention will become apparent in the following detailed description of the preferred embodiment with reference to the accompanying drawings, of which:

FIG. 2b illustrates a waveform of a first control signal ($V_{D1}$) outputted by a first control module of the conventional interleaving power factor corrector and corresponding to S1 of FIG. 2a;

FIG. 2c illustrates a waveform of a second control signal ($V_{D2}$) outputted by a second control module of the conventional interleaving power factor corrector and corresponding to S2 of FIG. 2a;

FIGS. 2d and 2e illustrate waveforms of the second control signal ($V_{D2}$) corresponding respectively to S3 and S4 of FIG. 2a;

DETAILED DESCRIPTION OF THE PREFERRED EMBODIMENT

Figure 3:
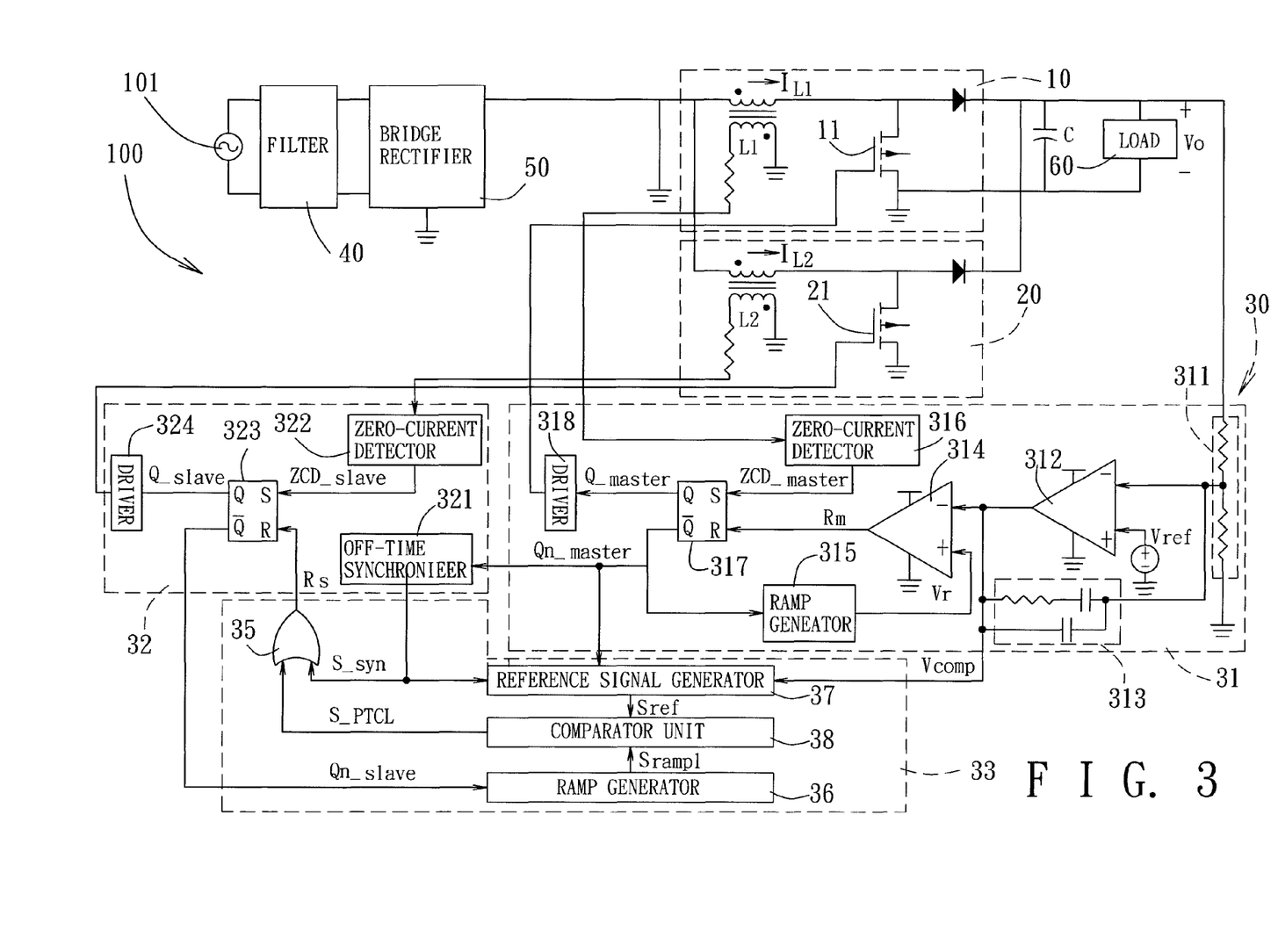
FIG. 3 is a schematic circuit block diagram illustrating the preferred embodiment of an interleaving power factor corrector according to the present invention.

Referring to FIG. 3, the preferred embodiment of an interleaving power factor corrector 100 according to the present invention is shown to include an EMI filter 40, a bridge rectifier 50, a first converting circuit 10, a second converting circuit 20, and a control device 30. In this embodiment, the interleaving power factor corrector 100 is a boundary condition mode (BCM) power factor corrector.

The filter 40 is adapted to be coupled to a voltage source 101 for filtering a voltage input therefrom to eliminate electromagnetic interference.

The bridge rectifier 50 is coupled to the filter 40 for rectify the voltage input filtered by the filter 40.

In this embodiment, the first and second converting circuits 10, 20 are coupled in parallel each other. Each of the first and second converting circuits 10, 20 includes a combination of an inductor (L1, L2) and a power switch 11, 12. The power switched 11, 12 of the first and second converting circuits 10, 20 have control ends for receiving respectively first and second control signals such that the power switch 11, 12 of each of the first and second converting circuits 10, 20 is operable between an ON-mode and an OFF-mode in response to a corresponding one of the first and second control signals.

The control device 30 interleavingly drives the first and second converting circuits 10, 20 such that the first and second converting circuits 10, 20 provide a current output to charge a capacitor (C). Thus, a voltage across the capacitor (C) serves as a voltage output (Vo) that is adapted to be applied to a load 60. The control device 30 includes a first control module 31, a second control module 32, and a phase modulating module 33.

Figure 4A:
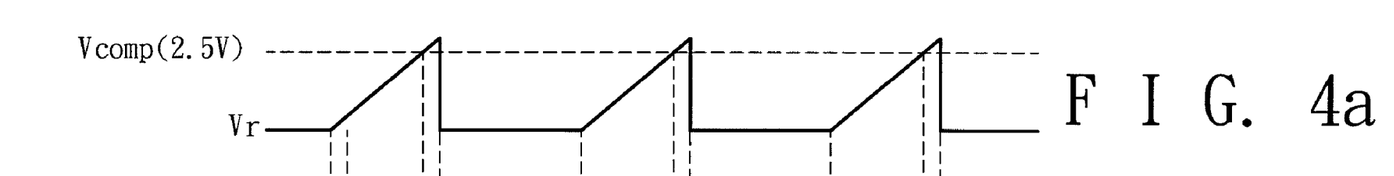
FIGS. 4a to 4d illustrate respectively waveforms of a ramp signal (Vr), an activating signal (ZCD_master), a reset signal (Rm) and a first driving signal (Q_master) generated by a first control module of the preferred embodiment.
Figure 4B:
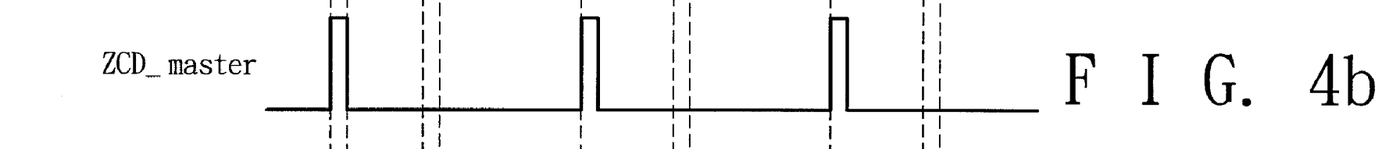
Figure 4C:
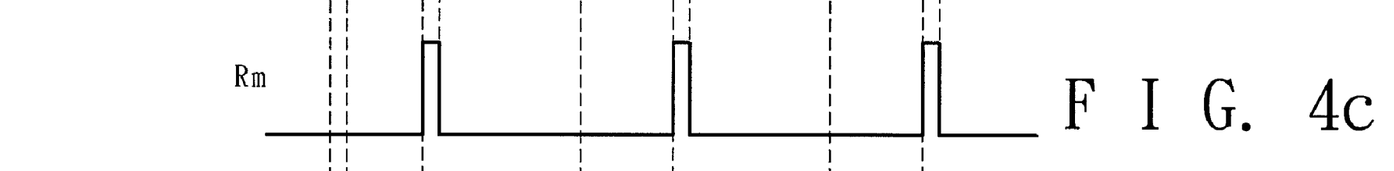
Figure 4D:
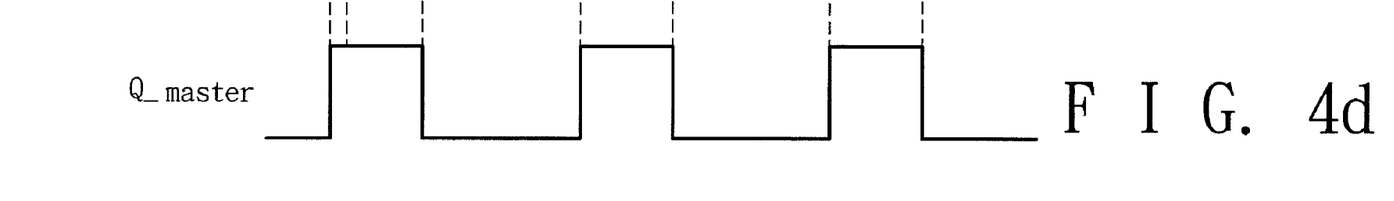

In this embodiment, the first control module 31 includes a voltage divider 311, a feedback amplifier unit, a comparator 314, a zero-current detector 316, an RS latch 317, a ramp generator 315, and a driver 318. The voltage divider 311 receives the voltage output (Vo), and generates a divided voltage in accordance with the voltage output (Vo). The feedback amplifier unit includes an amplifier 312 and a compensation circuit 313. The amplifier 312 has an inverting input end serving as a first input and coupled to the voltage divider for receiving the divided voltage therefrom, a non-inverting input end serving as a second input for receiving a reference voltage (Vref), and an output. The compensation circuit 313 is coupled between the first input and the output of the amplifier 312 such that the feedback amplifier unit outputs a feedback compensation signal (Vcomp) at the output of the amplifier 312. The feedback compensation signal (Vcomp) is a voltage of 2.5V in this embodiment. The comparator 314 has an inverting input end coupled to the output of the amplifier 412 for receiving the feedback compensation signal (Vcomp) therefrom, a non-inverting input end for receiving a ramp signal (Vr), as shown in FIG. 4a, and an output end. The comparator 314 compares the feedback compensation signal (Vcomp) and the ramp signal (Vr) received thereby, and outputs a reset signal (Rm) based on a comparison result made thereby. The zero-current detector 316 is coupled to the inductor (L1) of the first converting circuit 10 for detecting a current ($I_{L1}$) flowing therethrough, and generates an activating signal (ZCD_master), as shown in FIG. 4b, upon detecting that the current ($I_{L1}$) flowing through the inductor (L1) of the first converting circuit is zero. The RS latch 317 has a set input coupled to the zero-current detector 316 for receiving the activating signal (ZCD_master) therefrom, a reset input coupled to the output end of the comparator 314 for receiving the reset signal (Rm) therefrom, a data output for outputting a first driving signal (Q_master) corresponding to the first control signal, and an inverted data output for outputting an inverted first driving signal (Qn_master). The ramp generator 315 is coupled to the inverted data output of the SR latch 317 and the non-inverting input end of the comparator 314, receives the inverted first driving signal (Qn_master) from the inverted data output of the SR latch 317, and output the ramp signal (Vr) to the non-inverting input end of the comparator 314 based on the inverted first driving signal (Qn_master) received thereby. The driver 318 is coupled to the data output of the RS latch 317 and the control end of the power switch 11 of the first converting circuit 10, receives the first driving signal (Q_master) from the data output of the RS latch 317, and outputs the first control signal to the control end of the power switch 11 of the first converting circuit 10 based on the first driving signal (Q_master) received thereby. Referring to FIGS. 4a to 4d, when the activating signal (ZCD_master) generated by the zero-current detector 316 has a high level, the first driving signal (Q_master) has a high level until the ramp signal (Vr) generated by the ramp generator 315 is greater than the feedback compensation signal (Vcomp), i.e., 2.5V, such that the reset signal (Rm) outputted at the output of comparator 314 has a high level. Then, the first driving signal (Q_master) is switched from the high level to a low level.

Figure 8:
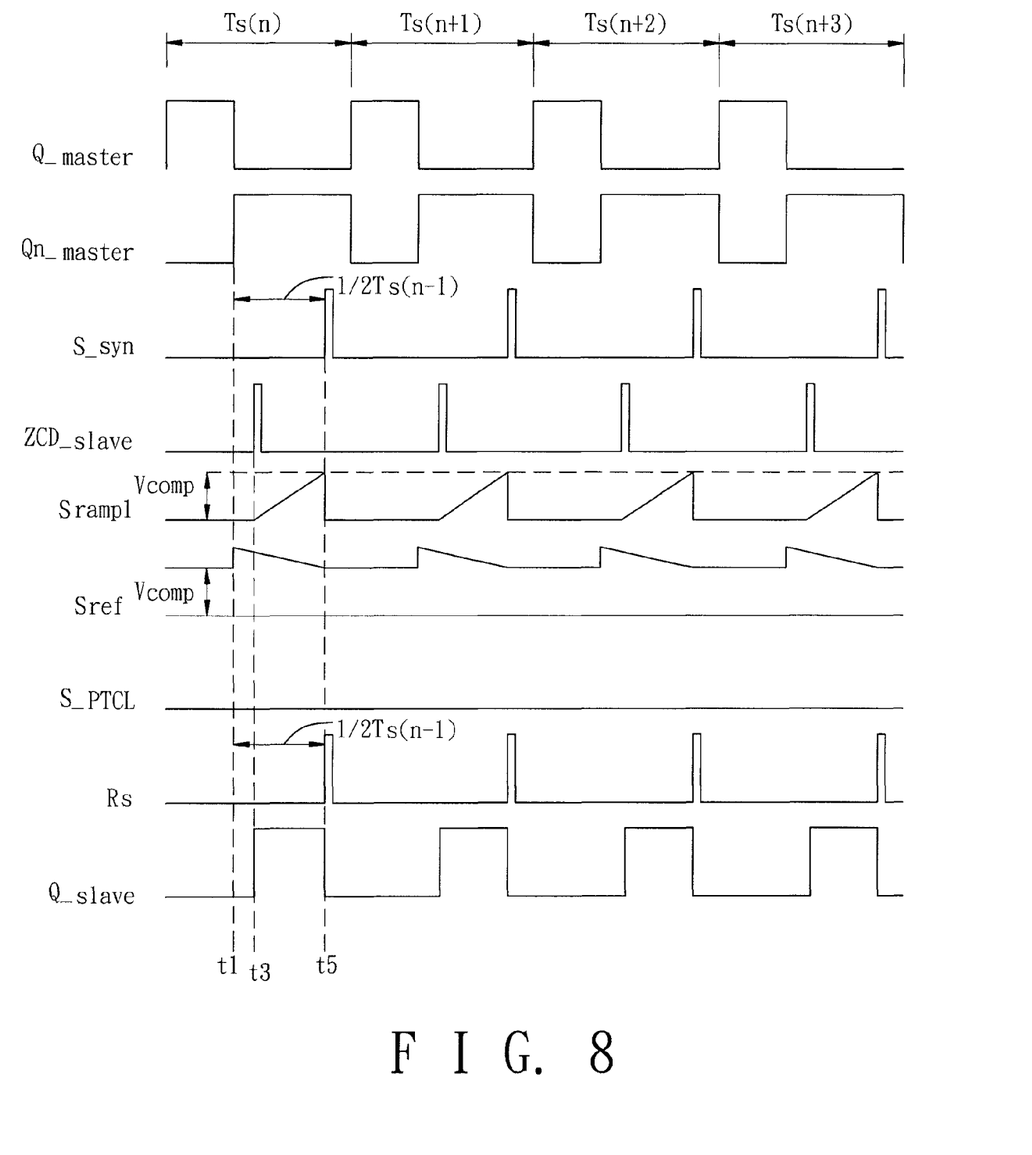
FIG. 8 illustrates waveforms of the first driving signal (Q_master), the inverted first driving signal (Qn_master), the first reset signal (S_syn), an activating signal (ZCD_slave) generated by the second control module, the first ramp signal (Sramp1), the reference signal (Sref), a second reset signal (S_PTCL) and an output signal (Rs) generated by the phase modulating module, and the second driving signal (Q_slave) when the preferred embodiment is operated in an ideal condition.

In this embodiment, the second control module 32 includes an off-time synchronizer 321, a zero-current detector 322, an RS latch 323, and a driver 324. The off-time synchronizer 321 is coupled to the inverted data output of the RS latch 317 of the first control module 31 for receiving the inverted first driving signal (Qn_master) therefrom, and outputs a first reset signal (S_syn) upon detecting that the inverted first driving signal (Qn_master) has a predetermined level for a predetermined duration. In this embodiment, the predetermined level is a high level, and the predetermined duration is $T_S/2$, where $T_S$ is the time period of a previous cycle of the first driving signal (Q_master), as shown in FIG. 8. The zero-current detector 322 is coupled to the inductor (L2) of the second converting circuit 20 for detecting a current ($I_{L2}$) flowing therethrough, and generates an activating signal (ZCD_slave) upon detecting that the current ($I_{L2}$) flowing through the inductor (L2) of the second converting circuit 20 is zero. The RS latch 323 has a set input coupled to the zero-current detector 322 for receiving the activating signal (ZCD_slave) therefrom, a reset input for receiving an output signal (Rs), a data output for outputting a second driving signal (Q_slave), and an inverted data output for outputting an inverted second driving signal (Qn_slave). The driver 324 is coupled to the data output of the RS latch 323 and the control end of the power switch 21 of the second converting circuit 20, receives the second driving signal (Q_slave) from the data output of the RS latch 323, and outputs the second control signal to the control end of the power switch 21 of the second converting circuit 20 based on the second driving signal (Q_slave) received thereby.

The phase modulating module 33 includes a reference signal generator 37, a ramp generator 36, a comparator unit 38, and a logic gate 35.

Figure 5:
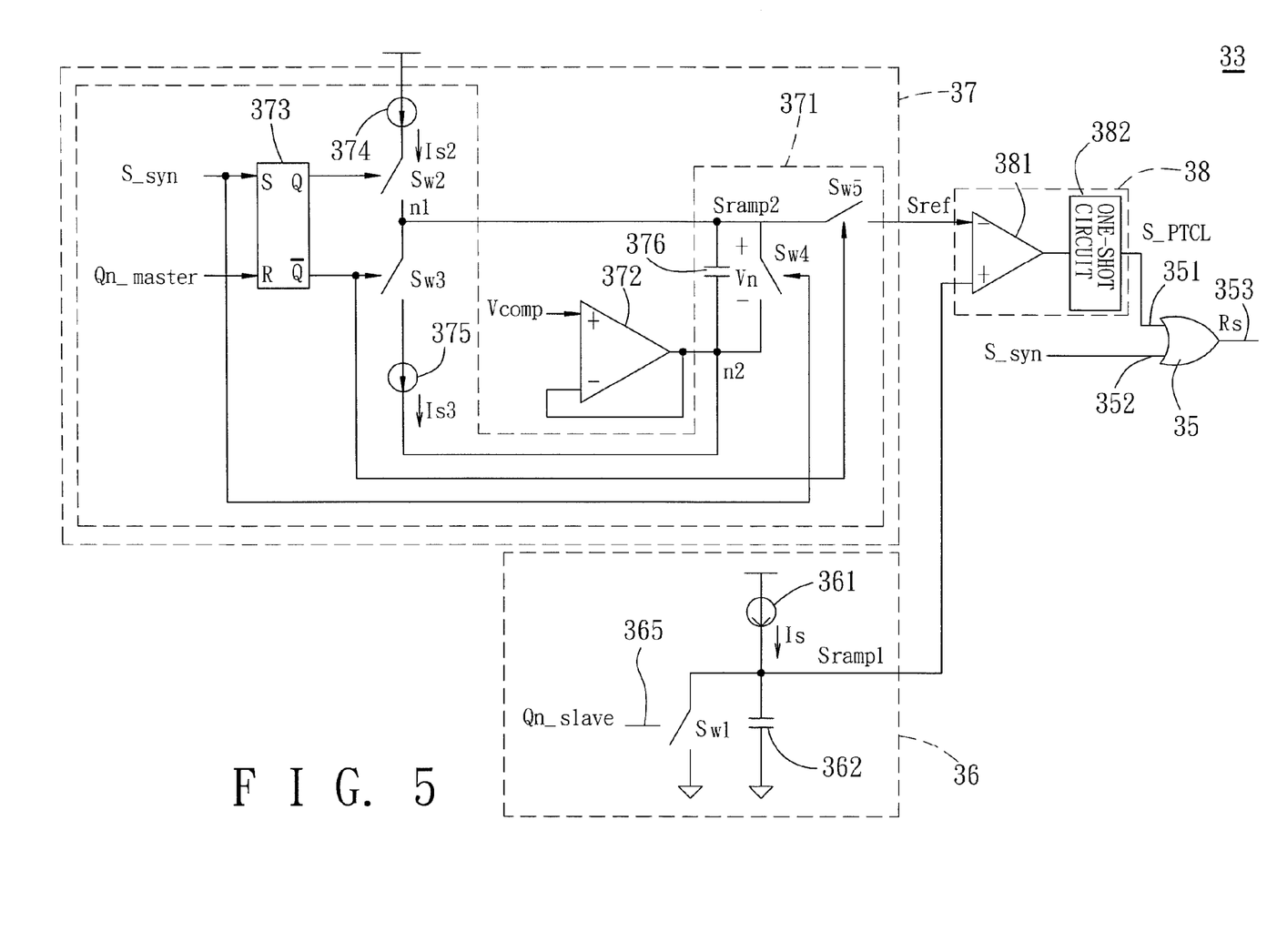
FIG. 5 is a schematic electrical circuit diagram illustrating a phase modulating module of the preferred embodiment.
Figure 6A:
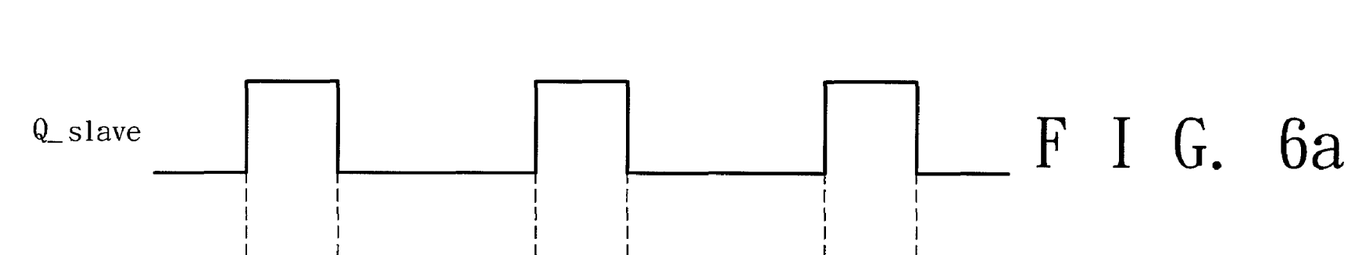
FIGS. 6a and 6b illustrate respectively waveforms of a second driving signal (Q_slave) and an inverted second driving signal (Qn_slave) generated by a second control module of the preferred embodiment.
Figure 6B:
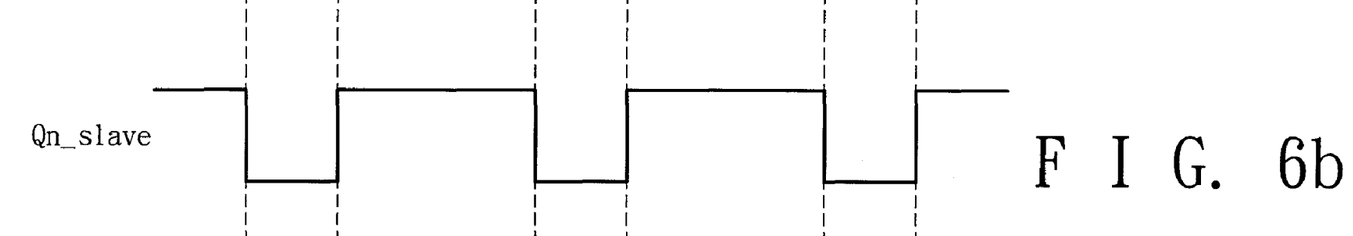
Figure 6C:
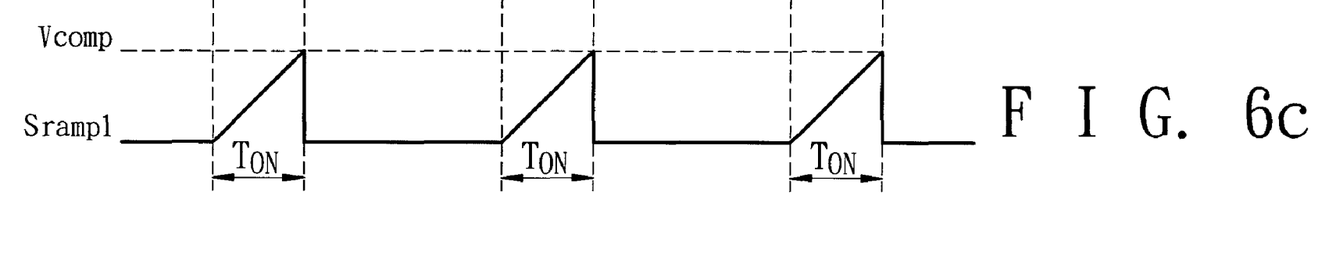
FIG. 6c illustrates a waveform of a first ramp signal (Sramp1) generated by a ramp generator of the phase modulating module based on the inverted second driving signal (Qn_slave) of FIG. 6b.
Figure 7A:
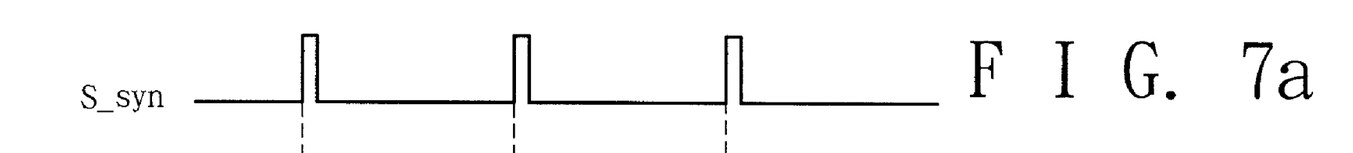
FIGS. 7a and 7b illustrate respectively waveforms of a first reset signal (S_syn) generated by a second control module of the preferred embodiment, and an inverted first driving signal (Qn_master) generated by the first control module.
Figures 7B, 7C:
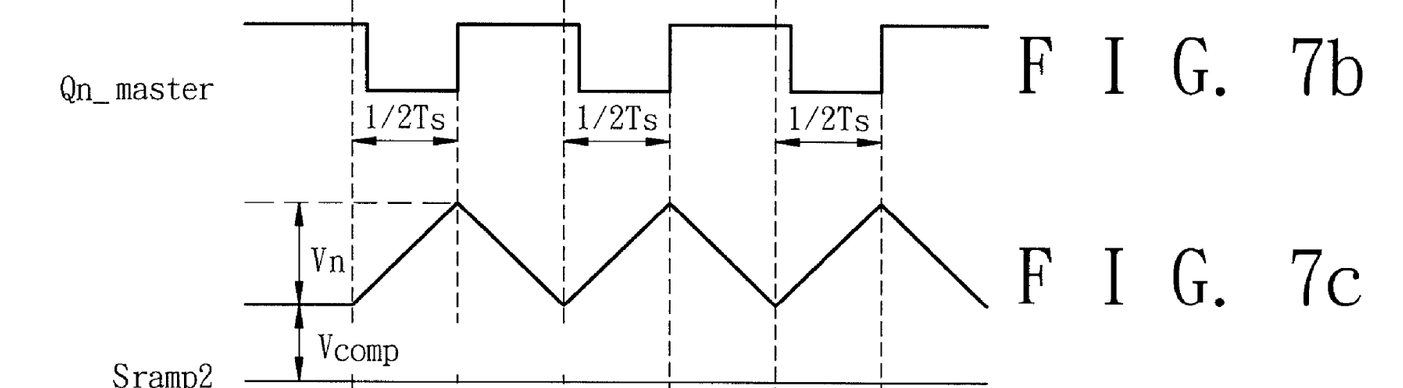
FIGS. 7c and 7d illustrate respectively waveforms of a second ramp signal (Sramp2) and a reference signal (Sref) generated by the phase modulating module based on the first reset signal (S_syn) of FIG. 7a and the inverted second driving signal (Qn_slave) of FIG. 7b.
Figure 7D:
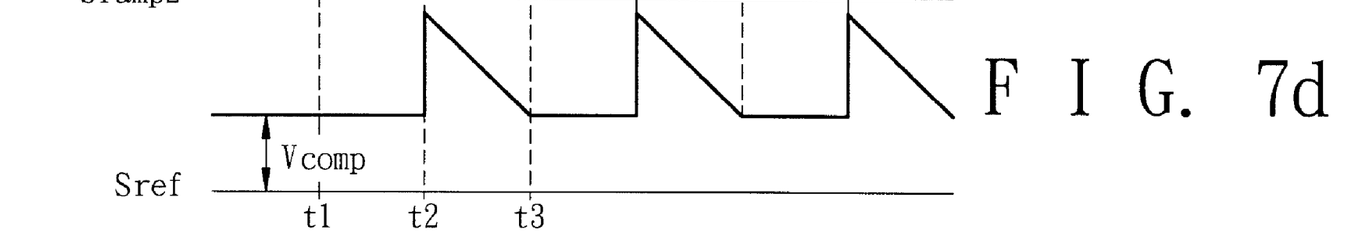

The ramp generator 36 is coupled to the inverted data output of the RS latch 323 of the second control module 32 for receiving the inverted second driving signal (Qn_slave) therefrom, and generates a first ramp signal (Sramp1) based on the inverted second driving signal (Qn_slave) received thereby. Referring further to FIG. 5, in this embodiment, the ramp generator 36 includes a current source 361, and a parallel connection of a switch (Sw1) and a capacitor 362 coupled between the current source 361 and a reference node, such as ground. The switch (Sw1) has a control end 365 coupled to the inverted data output of the SR latch 323 of the second control module 32 for receiving the inverted second driving signal (Qn_slave) therefrom. A voltage across the capacitor 362 serves as the first ramp signal (Sramp). Referring to FIGS. 6b and 6c, when the inverted second driving signal (Qn_slave) has a low level, the switch (Sw1) is in an OFF-mode such that the capacitor 362 is charged by a current (Is) from the current source 361 to a level equal to that of the feedback compensation signal (Vcomp), thereby obtaining the first ramp signal (Sramp). Thus, a charge period ($T_{ON}$) of the capacitor 362 is represented as follows:

$$Cs \cdot Vcomp = Is \cdot T_{ON} \quad \text{(Equation 1)}$$

$$T_{ON} = \frac{Cs \cdot Vcomp}{Is}$$

where Cs is the capacitance of the capacitor 362. In this embodiment, the charge period ($T_{ON}$) of the capacitor 362 serves as the duty cycle of the second driving signal (Q_slave).

The reference signal generator 37 is coupled to the first and second control modules 31, 32, receives the inverted first driving signal (Qn_master) and the feedback compensation signal (Vcomp) from the first control module 31, and generates a reference signal (Sref) based on the inverted first driving signal (Qm_master), the feedback compensation signal (Vcomp) and the first reset signal (S_syn) received thereby. As shown in FIG. 5, in this embodiment, the reference signal generator 37 includes a ramp circuit 371 and a buffer 372. The ramp circuit 371 includes a series connection of a first current source 374, a first switch (Sw2), a second switch (Sw3) and a second current source 375, a capacitor 376, a third switch (Sw4), a fourth switch (Sw5), and an SR latch 373. Each of the first and second switches (Sw2, Sw3) has a control end. The capacitor 376 is coupled between a first common node (n1) of the first and second switches (Sw2, Sw3), and the second current 375. The third switch (Sw4) is coupled in parallel to the capacitor 376, and has a control end coupled to the off-time synchronizer 321 for receiving the first reset signal (S_syn) therefrom. The fourth switch (Sw5) is coupled to the first common node (n1), and has a control end. The RS latch 373 has a set input coupled to the off-time synchronizer 321 of the second control module 32 for receiving the first reset signal (S_syn) therefrom, a reset input coupled to the inverted data output of the RS latch 317 of the first control module 31 for receiving the inverted first driving signal (Qn_master) therefrom, a data output coupled to the control end of the first switch (Sw2), and an inverted data output coupled to the control ends of the second and fourth switches (Sw3, Sw5). The buffer 372 is a unity gain buffer in this embodiment, and has a non-inverting input serving as a first input and coupled to the output of the amplifier 312 of the first control module 31 for receiving the feedback compensation signal (Vcomp) therefrom, and a second input and an output coupled to a common node (n2) of the second current source 375 and the capacitor 376. A second ramp signal (Sramp2) is generated at the first common node (n1), and serves as the reference signal (Sref) when the fourth switch (Sw5) is in an ON-mode. Referring to FIGS. 7a to 7d, during a period from t1 to t2, when the first reset signal (S_syn) has a high level, the first and fourth switches (Sw2, Sw5) conduct and the second and third switches (Sw3, Sw4) do not conduct such that the capacitor 376 is charged by a current (Is2) from the first current source 374 for the period from t1 to t2. Thus, a voltage (Vn) across the capacitor 376 is represented as follows:

$$C_{S2} \cdot Vn = I_{S2} \cdot \frac{1}{2} \cdot Ts \quad \text{(Equation 2)}$$

-continued $$Vn = \frac{1}{2} \cdot \frac{I_{S2}}{C_{S2}} \cdot Ts$$

where $C_{S2}$ is the capacitance of the capacitor 376, and Ts is the cycle of the first driving signal (Q_master). The potential at the second common node (n2) maintains a level equal to that of the feedback compensation signal (Vcomp). In this case, the reference signal (Sref) has a level equal to that of the feedback compensation signal (Vcomp). On the other hand, during a period from t2 to t3, when the inverted first driving signal (Qn_master) has a high level, the first and fourth switches (Sw2, Sw5) do not conduct and the second and third switches (Sw3, Sw4) conduct such that the capacitor 376 discharges through the second switch (Sw3). In this case, the second ramp signal (Sramp2) serves as the reference signal (Sref).

The comparator unit 38 is coupled to the reference signal generator 37 and the ramp generator 36 for receiving respectively the reference signal (Sref) and the first ramp signal (Sramp1) therefrom, compares the reference signal (Sref) and the first ramp signal (Sramp1) received thereby, and outputs the second reset signal (S_PTCL) that has a predetermined level when a level of the first ramp signal (Sramp1) is greater than that of the reference signal (Sref). In this embodiment, the predetermined level is a high level. As shown in FIG. 5, the comparator unit 38 includes a comparator 381 and a one-shot circuit 382. The comparator 381 has first and second input ends, such as inverting and non-inverting input ends, coupled respectively to the reference signal generator 37 and the ramp generator 36 for receiving respectively the reference signal (Sref) and the first ramp signal (Sramp1) therefrom, and an output end for outputting an output based on the reference signal (Sref) and the first ramp signal (Sramp1) received thereby. The one-shot circuit 382 is coupled to the output end of the comparator, receives the output from the output end of the comparator 381, and converts the output received thereby in the form of a pulse. The output converted by the one-shot circuit serves as the second reset signal (S_PTCL).

As shown in FIGS. 3 and 5, the logic gate 35 is an OR gate in this embodiment, and has first and second inputs 351, 352 coupled respectively to the one-shot circuit 381 of the comparator unit 38 and the off-time synchronizer 321 of the second control module 32 for receiving respectively the second and first reset signals (S_PTCL, S_syn) therefrom, and an output 353 coupled to the reset input of the RS latch 323 of the second control module 32 for outputting the output signal (Rs) therero. Therefore, when one of the first and second reset signals (S_syn, S_PTCL) has the predetermined level, i.e., the high level, the second driving signal (Q_slave) has a level, i.e., a low level, for switching the power switch 21 of the second converting circuit 20 to the OFF-mode.

FIG. 8 illustrates waveforms of the first driving signal (Q_master), the inverted first driving signal (Qn_master), the first reset signal (S_syn), the activating signal (ZCD_slave), the first ramp signal (Sramp1), the reference signal (Sref), the second reset signal (S_PTCL), the output signal (Rs) and the second driving signal (Q_slave) when the preferred embodiment is operated in an ideal condition, where delay on the zero-current detector 322 of the second control module 32 does not occur and there is no external noise interference in the current ($I_{L2}$) flowing through the inductor (L2). Referring to FIGS. 3, 5 and 8, during an $n^{th}$ cycle period of the first driving signal (Q_master), i.e., Ts(n), the inverted first driving signal (Qn_master) is switched to a high level at t1. When the inverted first driving signal (Qn_master) maintains the high level for half the period (Ts(n−1)) of an (n−1)$^{th}$ cycle of the first driving signal (Q_master), the off-time synchronizer 321 outputs the first reset signal (S_syn) having a high level at t5. The activating signal (ZCD_slave) outputted by the zero-current detector 322 of the second control module 32 has a high level at t3 such that the second driving signal (Q_slave) is switched to a high level at t3 and that the inverted second driving signal (Qn_slave) has a low level at t3. Thus, the capacitor 362 of the ramp generator 36 is charged to the level of feedback compensation signal (Vcomp) during a period from t3 to t5. In other words, the first ramp signal (Sramp1) gradually increases during the period from t3 to t5. Since the inverted first driving signal (Qn_master) is switched to the high level at t1, the capacitor 367 of the ramp circuit 371 discharges through the second switch (Sw3) during a period of t1 to t5 such that the reference signal (Sref) gradually decreases to the level of the feedback compensation signal (Vcomp) during the period from t1 to t5. The second reset signal (S_PTCL) maintains a low level during the period from t1 to t5 because the first ramp signal (Sramp1) is not greater than the reference signal (Sref), and the first reset signal (S_syn) is switched to the high level at t5 such that the output signal (Rs) is switched to a high level at t5. Thus, the second driving signal (Q_slave) is switched from the high level to a low level at t5.

In this embodiment, the first driving signal (Q_master) has a frequency that varies with the load 60. Therefore, a time point at which the activating signal (ZCD_slave) is triggered to have the high level will change.

Figure 9:
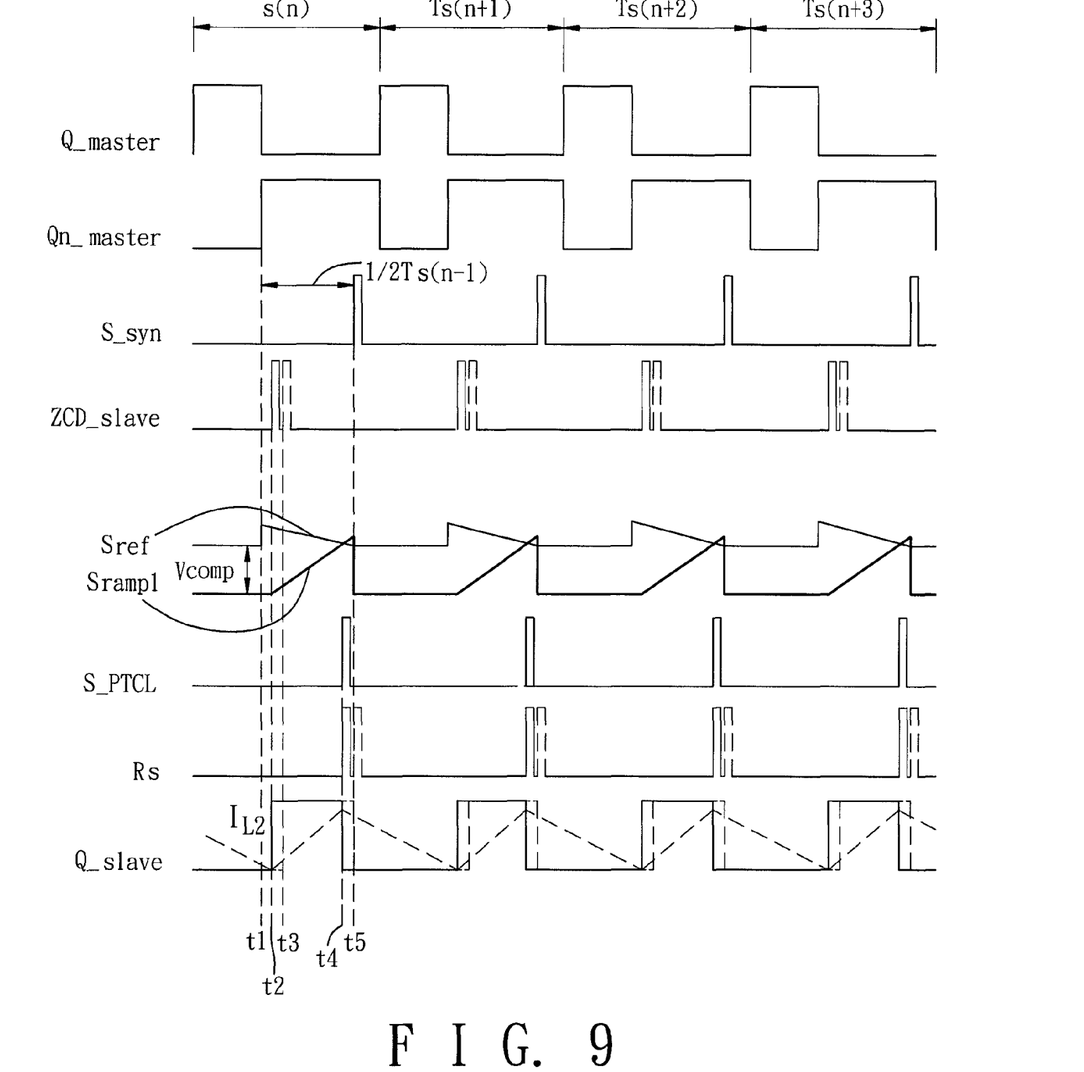
FIGS. 9 and 10 illustrate waveforms of the first driving signal (Q_master), the inverted first driving signal (Qn_master), the first reset signal (S_syn), an activating signal (ZCD_slave) generated by the second control module, the first ramp signal (Sramp1), the reference signal (Sref), a second reset signal (S_PTCL) and an output signal (Rs) generated by the phase modulating module, the second driving signal (Q_slave), and a current ($I_{L2}$) flowing through an inductor of a second converting circuit of the preferred embodiment when the preferred embodiment is operated in non-ideal conditions.

FIG. 9 illustrates waveforms of the first driving signal (Q_master), the inverted first driving signal (Qn_master), the first reset signal (S_syn), the activating signal (ZCD_slave), the first ramp signal (Sramp1), the reference signal (Sref), the second reset signal (S_PTCL), the output signal (Rs), the second driving signal (Q_slave), and the current ($I_{L2}$) when the preferred embodiment is operated in a lead condition, where a time point at which the current ($I_{L2}$) becomes zero leads that in the ideal condition.

Referring to FIGS. 3, 5 and 9, during an n$^{th}$ cycle period (Ts(n)) of the first driving signal (Q_master), the activating signal (ZCD_slave) generated by the zero-current detector 322 is triggered to have the high level at t2 earlier to t3 at which the activating signal (ZCD_slave), as indicated by dotted lines, is triggered to have the high level in the ideal condition. As a result, a charging period of the capacitor 362, i.e., a period from t2 to t5, is longer than that in the ideal condition, i.e., the period from t3 to t5, such that the first ramp signal (Sramp1) is greater than the reference signal (Sref) at t4. Thus, the second reset signal (S_PTCL) is triggered to have a high level at t4 such that the output signal (Rs) is switched to a high level, and the second driving signal (Q_slave) is switched from a high level to a low level at t4 earlier to t5 at which the second driving signal (Q_slave), as indicated by dotted lines, is switched from a high level to a low level in the ideal condition. In this case, the current ($I_{L2}$) does not diverge.

Figure 10:
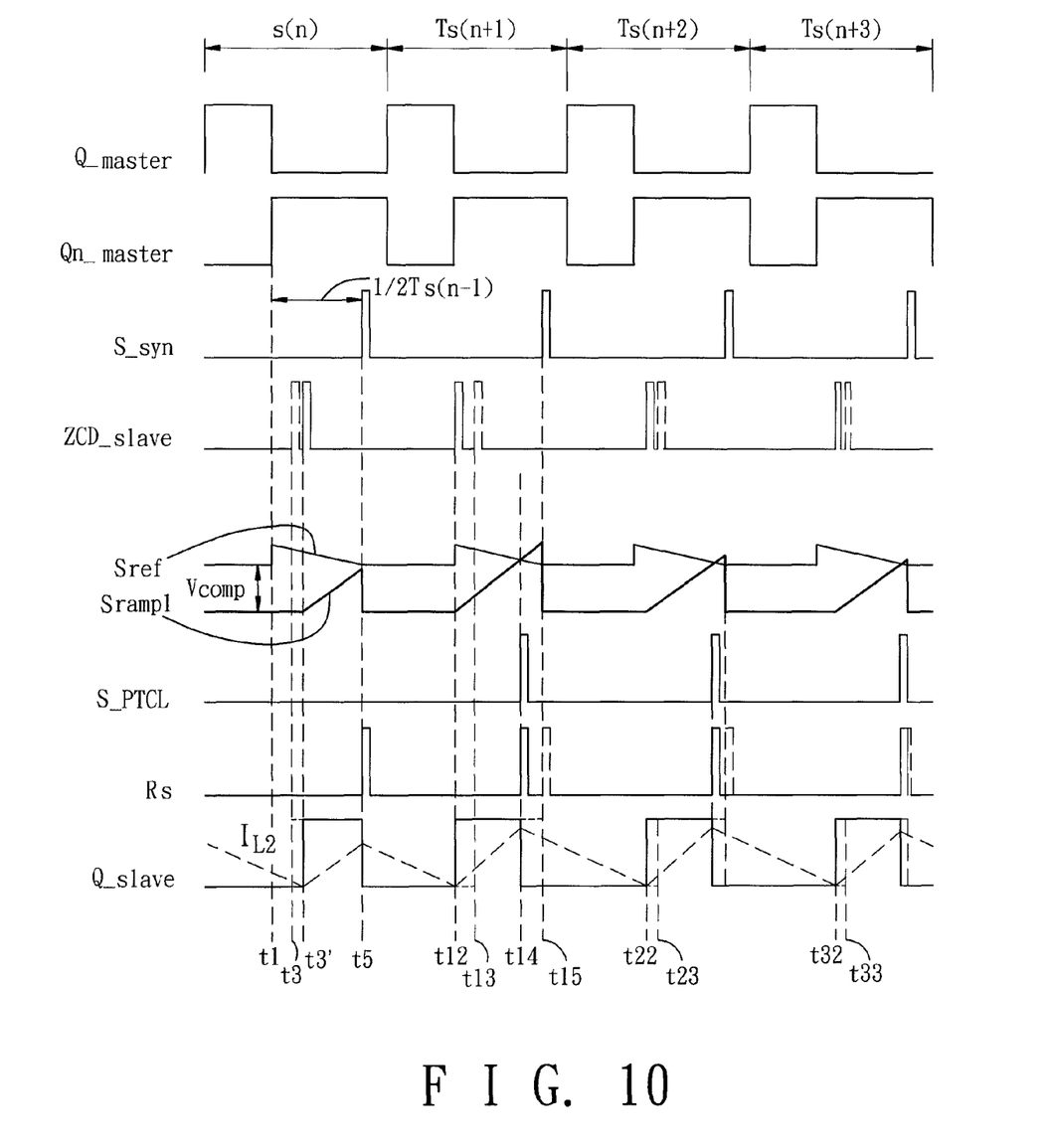

FIG. 10 illustrate waveforms of the first driving signal (Q_master), the inverted first driving signal (Qn_master), the first reset signal (S_syn), the activating signal (ZCD_slave), the first ramp signal (Sramp1), the reference signal (Sref), a second reset signal (S_PTCL), the output signal (Rs), the second driving signal (Q_slave), and the current ($I_{L2}$) when the preferred embodiment is operated in a lag condition, where a time point at which the current ($I_{L2}$) becomes zero lags that in the ideal condition as a result of interference.

Referring to FIGS. 3, 5 and 10, during an n$^{th}$ cycle period (Ts(n)) of the first driving signal (Q_master), the activating signal (ZCD_slave) is triggered to have the high level at t3' later to t3 at which the activating signal (ZCD_slave), as indicated by dotted lines, is triggered to have the high level in the ideal condition. As a result, a charging period of the capacitor 362, i.e., a period from t3' to t5, is shorter than that in the ideal condition, i.e., the period from t3 to t5, such that the first ramp signal (Sramp1) is not greater than the reference signal (Sref) during the period from t3' to t5. Thus, the second reset signal (S_PTCL) maintains a low level during Ts(n). The output signal (Rs) is switched to a high level at t5 in response to the first reset signal (S_syn). It is noted that the second driving signal (Q_slave) has a duty cycle, i.e., the period from t3' to t5, that is shorter than that in the ideal condition, i.e., the period from t3 to t5. Therefore, the current ($I_{L2}$) has a maximum at t5 smaller than that in the ideal condition. In other words, energy stored in the inductor (L2) of the second converting circuit 20 is less than that in the ideal condition.

During an (n+1)$^{th}$ cycle period (Ts(n+1)) of the first driving signal (Q_master), the activating signal (ZCD_slave) is triggered to have the high level at t12 earlier to t13 at which the activating signal (ZCD_slave), as indicated by dotted lines, is triggered to have the high level in the ideal condition. As a result, a charging period of the capacitor 362, i.e., a period from t12 to t15, is longer than that in the ideal condition, i.e., the period from t13 to t15, such that the first ramp signal (Sramp1) is greater than the reference signal (Sref) at t14. Thus, the second reset signal (S_PTCL) is switched to a high level at t14 such that the output signal (Rs) is switched to a high level at t14 in response to the second reset signal (S_PTCL), and the second driving signal (Q_slave) is switched from a high level to a low level at t14 earlier to t5 at which the second driving signal (Q_slave), as indicated by dotted lines, is switched from a high level to a low level in the ideal condition. It is noted that a duty cycle of the second driving signal (Q_slave) in the (n+1)$^{th}$ cycle, i.e., the period from t12 to t14, is greater than that in the n$^{th}$ cycle, i.e., the period from t3' to t5. Therefore, the current ($I_{L2}$) has a value at t14 larger than that at t5. In other words, energy stored in the inductor (L2) of the second converting circuit 20 during the (n+1)$^{th}$ cycle period (Ts(n+1)) is greater than that during the n$^{th}$ cycle period (Ts(n)).

Similarly, During an (n+2)$^{th}$ cycle period (Ts(n+2)) of the first driving signal (Q_master), the second driving signal (Q_slave) is switched to a high level at t22 earlier to t23 in the ideal condition. During an (n+3)$^{th}$ cycle period (Ts(n+3)) of the first driving signal (Q_master), the second driving signal (Q_slave) is switched to a high level at t32 earlier to t33 in the ideal condition. It is noted that a period from t32 to t33 is less than a period from t22 to t23 that is less than a period from t12 to t13. Therefore, the phase modulating module 33 is operable so that the second driving signal (Q_slave) gradually converges to approach that in the ideal condition.

In sum, no matter whether drift of the activating signal (ZCD_slave) occurs, i.e., the zero point of the current ($I_{L2}$) drifts, the phase modulating module 33 is operable to control the duty cycle of the second driving signal (Q_slave) using the first reset signal (S_syn) or the second reset signal (S_PTCL). Therefore, the second driving signal (Q_slave) can follow variance of the first driving signal (Q_master) even though the duty cycle of the first driving signal (Q_master) varies with the load 60, thereby ensuring a stable current ($I_{L2}$). Thus, the interleaving power factor corrector 100 of this invention can ensure the stable voltage output (Vo).

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A control device for interleavingly driving first and second converting circuits of an interleaving power factor corrector such that the interleaving power factor corrector generates a voltage output (Vo), each of the first and second converting circuits including a combination of an inductor and a power switch, the power switches of the first and second converting circuits having control ends for receiving respectively first and second control signals such that the power switch of each of the first and second converting circuits is operable between an ON-mode and an OFF-mode in response to a corresponding one of the first and second control signals, said control device comprising:

a first control module adapted for detecting a current flowing through the inductor of the first converting circuit, outputting a feedback compensation signal (Vcomp) based on the voltage output (Vo) generated by the interleaving power factor corrector, and generating a first driving signal (Q_master) corresponding to the first control signal based on a result of current detection performed thereby and the feedback compensation signal (Vcomp), said first control module further outputting an inverted first driving signal (Qn_master);

a second control module adapted for detecting a current flowing through the inductor of the second converting circuit, receiving the inverted first driving signal (Qn_master) from said first control module, outputting a first reset signal (S_syn) based on the inverted first driving signal (Qn_master) received thereby, and generating a second driving signal (Q_slave) corresponding to the second control signal based on a result of current detection performed thereby, the first reset signal (S_syn) and a second reset signal (S_PTCL), said second control module further outputting an inverted second driving signal (Qn_slave); and a phase modulating module including
a reference signal generator coupled to said first and second control modules, receiving the inverted first driving signal (Qn_master) and the feedback compensation signal (Vcomp) from said first control module, and the first reset signal (S_syn) from said second control module, and generating a reference signal (Sref) based on the inverted first driving signal (Qn_master), the feedback compensation signal (Vcomp) and the first reset signal (S_syn) received thereby,
a ramp generator coupled to said second control module, receiving the inverted second driving signal (Qn_slave) from said second control module, and generating a first ramp signal (Sramp1) based on the inverted second driving signal (Qn_slave) received thereby, and
a comparator unit coupled to said reference signal generator and said ramp generator for receiving respectively the reference signal (Sref) and the first ramp signal (Sramp1) therefrom, comparing the reference signal (Sref) and the first ramp signal (Sramp1) received thereby, and outputting the second reset signal (S_PTCL) that has a predetermined level when a level of the first ramp signal (Sramp1) is greater than that of the reference signal (Sref);
wherein, when one of the first and second reset signals (S_syn, S_PTCL) has the predetermined level, the second driving signal (Q_slave) generated by said second control module has a level for switching the power switch of the second converting circuit to the OFF-mode.

2. The control device as claimed in claim 1, wherein said ramp generator includes:
a current source; and
a parallel connection of a switch and a capacitor coupled between said current source and a reference node, said switch having a control end coupled to said second control module for receiving the inverted second driving signal (Qn_slave) therefrom, a voltage across said capacitor serving as the first ramp signal (Sramp1).

3. The control device as claimed in claim 1, wherein said reference signal generator includes:
a ramp circuit including
a series connection of a first current source, a first switch, a second switch and a second current source, each of said first and second switches having a control end,
a capacitor coupled between a first common node of said first and second switches, and said second current source,
a third switch coupled in parallel to said capacitor and having a control end coupled to said second control module for receiving the first reset signal (S_syn) therefrom,
a fourth switch coupled between said first common node and said comparator unit, and having a control end, and
an SR latch having a set input coupled to said second control module for receiving the first reset signal (S_syn) therefrom, a reset input coupled to said first control module for receiving the inverted first driving signal (Qn_master) therefrom, a data output coupled to said control end of said first switch, and an inverted data output coupled to said control ends of said second and fourth switches; and
a buffer having a first input coupled to said first control module for receiving the feedback compensation signal (Vcomp) therefrom, and a second input and an output coupled to a second common node of said second current source and said capacitor;
wherein a second ramp signal (Sramp2) is generated at said first common node, and serves as the reference signal (Sref) when said fourth switch is in an ON-mode.

4. The control device as claimed in claim 3, wherein said buffer is a unity gain buffer.

5. The control device as claimed in claim 1, wherein said phase modulating module further includes a logic gate having first and second inputs coupled respectively to said comparator unit of said phase modulating module and said second control module for receiving respectively the second reset signal (S_PTCL) and the first reset signal (S_syn) therefrom, and an output coupled to said second control module for outputting an output signal (Rs) thereto such that the second driving signal (Q_slave) generated by said second control module has the level for switching the power switch of the second converting circuit to the OFF-mode when the output signal (Rs) has the predetermined level.

6. The control device as claimed in claim 5, wherein said logic gate is an OR gate.

7. The control device as claimed in claim 5, wherein said comparator unit includes:
a comparator having first and second input ends coupled respectively to said reference signal generator and said ramp generator for receiving respectively the reference signal (Sref) and the first ramp signal (Sramp1) therefrom, and an output end for outputting an output based on the reference signal (Sref) and the first ramp signal (Sramp1) received thereby; and a one-shot circuit coupled between said output end of said comparator and said first input of said logic gate, receiving the output from said output end of said comparator, and converting the output received thereby in the form of a pulse, the output converted by said one-shot circuit serving as the second reset signal (S_PTCL).

8. The control device as claimed in claim 5, wherein said second control module includes:

an off-time synchronizer coupled to said first control module, and said reference signal generator and said second input of said logic gate of said phase modulating module, receiving the inverted first driving signal (Qn_master) from said first control module, and outputting the first reset signal (S_syn) to said reference signal generator and said second input of said logic gate of said phase modulating module upon detecting that the inverted first driving signal (Qn_master) has the predetermined level for a predetermined duration;

a zero-current detector adapted to be coupled to the inductor of the second converting circuit for detecting the current flowing therethrough, and generating an activating signal (ZCD_salve) upon detecting that the current flowing through the inductor of the second converting circuit is zero;

an RS latch having a set input coupled to said zero-current detector for receiving the activating signal (ZCD_slave) therefrom, a reset input coupled to said output of said logic gate of said phase modulating module for receiving the output signal (Rs) therefrom, a data output for outputting the second driving signal (Q_slave), and an inverted data output coupled to said ramp generator of said phase modulating module for outputting the inverted first driving signal (Qn_slave) thereto; and a driver coupled to said data output of said RS latch for receiving the second driving signal (Q_slave) therefrom, generating the second control signal based on the second driving signal (Q_slave) received thereby, and adapted to output the second control signal to the control end of the power switch of the second converting circuit.

9. The control device as claimed in claim 1, wherein said first control module includes:

a voltage divider adapted to be coupled to the interleaving power factor corrector for receiving the voltage output (Vo) therefrom, and generating a divided voltage in accordance with the voltage output (Vo) received thereby;

a feedback amplifier unit including an amplifier having a first input coupled to said voltage divider for receiving the divided voltage therefrom, a second input for receiving a reference voltage (Vref), and an output coupled to said reference signal generator, and a compensation circuit coupled between said first input and said output of said amplifier such that said feedback amplifier unit outputs the feedback compensation signal (Vcomp) at said output of said amplifier;

a comparator coupled to said output of said amplifier, receiving the feedback compensation signal (Vcomp) from said feedback amplifier unit and a ramp signal (Vr), comparing the feedback compensation signal (Vcomp) and the ramp signal (Vr) received thereby, and outputting a reset signal (Rm) based on a comparison result made thereby;

a zero-current detector adapted to be coupled to the inductor of the first converting circuit for detecting the current flowing therethrough, and generating an activating signal (ZCD_master) upon detecting that the current flowing through the inductor of the first converting circuit is zero;

an RS latch having a set input coupled to said zero-current detector for receiving the activating signal (ZCD_master) therefrom, a reset input coupled to said comparator for receiving the reset signal (Rm) therefrom, a data output for outputting the first driving signal (Q_master), and an inverted data output coupled to said second control module and said reference signal generator of said phase modulating module for outputting the inverted first driving signal (Qn_master) thereto;

a ramp generator coupled to said inverted data output of said SR latch and said comparator, receiving the inverted first driving signal (Qn_master) from said inverted data output of said SR latch, and outputting the ramp signal (Vr) to said comparator based on the inverted first driving signal (Qn_master) received thereby; and a driver coupled to said data output of said RS latch for receiving the first driving signal (Q_master) therefrom, generating the first control signal based on the first driving signal (Q_master) received thereby, and adapted to output the first control signal to the control end of the power switch of the first converting circuit.

10. An interleaving power factor corrector comprising:

first and second converting circuits each including a combination of an inductor and a power switch, said power switches of said first and second converting circuits having control ends for receiving respectively first and second control signals such that said power switch of each of said first and second converting circuits is operable between an ON-mode and an OFF-mode in response to a corresponding one of the first and second control signals; and a control device for interleavingly driving said first and second converting circuits such that said interleaving power factor corrector outputs a voltage output (Vo), said control device including a first control module coupled to said first converting circuit, detecting a current flowing through said inductor of said first converting circuit, outputting a feedback compensation signal (Vcomp) based on the voltage output (Vo), and generating a first driving signal (Q_master) corresponding to the first control signal based on a result of current detection performed thereby and the feedback compensation signal (Vcomp), said first control module further outputting an inverted first driving signal (Qn_master), a second control module coupled to said second converting circuit, detecting a current flowing through said inductor of said second converting circuit, receiving the inverted first driving signal (Qn_master) from said first control module, outputting a first reset signal (S_syn) based on the inverted first driving signal (Qn_master) from said first control module, and generating a second driving signal (Q_slave) corresponding to the second control signal based on a result of current detection performed thereby, the first reset signal (S_syn) and a second reset signal (S_PTCL), said second control module further outputting an inverted second driving signal (Qn_slave), and a phase modulating module including a reference signal generator coupled to said first and second control modules, receiving the inverted first driving signal (Qn_master) and the feedback compensation signal (Vcomp) from said first control module, and the first reset signal (S_syn) from said second control module, and generating a reference signal (Sref) based on the inverted first driving signal (Qn_master), the feedback compensation signal (Vcomp) and the first reset signal (S_syn) received thereby, a ramp generator coupled to said second control module for receiving the inverted second driving signal (Qn_slave) therefrom, and generating a first ramp signal (Sramp1) based on the inverted second driving signal (Qn_slave) received thereby, and a comparator unit coupled to said reference signal generator and said ramp generator for receiving respectively the reference signal (Sref) and the first ramp signal (Sramp1) therefrom, comparing the reference signal (Sref) and the first ramp signal (Sramp1) received thereby, and outputting the second reset signal (S_PTCL) that has a predetermined level when a level of the first ramp signal (Sramp1) is greater than that of the reference signal (Sref);

wherein, when one of the first and second reset signals (S_syn, S_PTCL) has the predetermined level, the second driving signal (Q_slave) generated by said control module has a level for switching said power switch of said second converting circuit to the OFF-mode.

11. The interleaving power factor corrector as claimed in claim 10, wherein said ramp generator of said control device includes:

a current source; and a parallel connection of a switch and a capacitor coupled between said current source and a reference node, said switch having a control end coupled to said second control module for receiving the inverted second driving signal (Qn_slave) therefrom, a voltage across said capacitor serving as the first ramp signal (Sramp1).

12. The interleaving power factor corrector as claimed in claim 10, wherein said reference signal generator of said control device includes:

a ramp circuit including
a series connection of a first current source, a first switch, a second switch and a second current source, each of said first and second switches having a control end,
a capacitor coupled between a first common node of said first and second switches, and said second current source,
a third switch coupled in parallel to said capacitor and having a control end coupled to said second control module for receiving the first reset signal (S_syn) therefrom,
a fourth switch coupled between said first common node and said comparator unit, and having a control end, and
an SR latch having a set input coupled to said second control module for receiving the first reset signal (S_syn) therefrom, a reset input coupled to said first control module for receiving the inverted first driving signal (Qn_master) therefrom, a data output coupled to said control end of said first switch, and an inverted data output coupled to said control ends of said second and fourth switches; and a buffer having a first input coupled to said first control module for receiving the feedback compensation signal (Vcomp) therefrom, and a second input and an output coupled to a second common node of said second current source and said capacitor;

wherein a second ramp signal (Sramp2) is generated at said first common node, and serves as the reference signal (Sref) when said fourth switch is in an ON-mode.

13. The interleaving power factor corrector as claimed in claim 12, wherein said buffer is a unity gain buffer.

14. The interleaving power factor corrector as claimed in claim 10, wherein said phase modulating module of said control device further includes a logic gate having first and second inputs coupled respectively to said comparator unit and said second control module for receiving respectively the second reset signal (S_PTCL) and the first reset signal (S_syn) therefrom, and an output coupled to said second control module for outputting an output signal (Rs) thereto such that the second driving signal (Q_slave) generated by said second control module has the level for switching the power switch of the second converting circuit to the OFF-mode when the output signal (Rs) has the predetermined level.

15. The interleaving power factor corrector as claimed in claim 14, wherein said logic gate includes an OR gate.

16. The interleaving power factor corrector as claimed in claim 14, wherein said comparator unit includes:

a comparator having first and second input ends coupled respectively to said reference signal generator and said ramp generator for receiving respectively the reference signal (Sref) and the first ramp signal (Sramp1) therefrom, and an output end for outputting an output based on the reference signal (Sref) and the first ramp signal (Sramp1) received thereby; and a one-shot circuit coupled between said output end of said comparator and said first input of said logic gate, receiving the output from said output end of said comparator, and converting the output received thereby in the form of a pulse, the output converted by said one-shot circuit serving as the second reset signal (S_PTCL).

17. The interleaving power factor corrector as claimed in claim 14, wherein said second control module includes:

an off-time synchronizer coupled to said first control module, and said reference signal generator and said second input of said logic gate of said phase modulating module, receiving the inverted first driving signal (Qn_master) from said first control module, and outputting the first reset signal (S_syn) to said reference signal generator and said second input of said logic gate of said phase modulating module upon detecting that the inverted first driving signal (Qn_master) has the predetermined level for a predetermined duration;

a zero-current detector coupled to said inductor of said second converting circuit for detecting the current flowing therethrough, and generating an activating signal (ZCD_salve) upon detecting that the current flowing through said inductor of said second converting circuit is zero;

an RS latch having a set input coupled to said zero-current detector for receiving the activating signal (ZCD_slave) therefrom, a reset input coupled to said output of said logic gate of said phase modulating module for receiving the output signal (Rs) therefrom, a data output for outputting the second driving signal (Q_slave), and an inverted data output coupled to said ramp generator of said phase modulating module for outputting the inverted first driving signal (Qn_slave) thereto; and a driver coupled to said data output of said RS latch and said control end of said power switch of said second converting circuit, receiving the second driving signal (Q_slave) from said data output of said RS latch, and outputting the second control signal to said control end of said power switch of said second converting circuit based on the second driving signal (Q_slave) received thereby.

18. The interleaving power factor corrector as claimed in claim 10, wherein said first control module includes:
 a voltage divider receiving the voltage output (Vo), and generating a divided voltage in accordance with the voltage output (Vo);
 a feedback amplifier unit including
  an amplifier having a first input coupled to said voltage divider for receiving the divided voltage therefrom, a second input for receiving a reference voltage (Vref), and an output coupled to said reference signal generator, and
  a compensation circuit coupled between said first input and said output of said amplifier such that said feedback amplifier unit outputs the feedback compensation signal (Vcomp) at said output of said amplifier;
 a comparator coupled to said output of said amplifier, receiving the feedback compensation signal (Vcomp) from said feedback amplifier unit and a ramp signal (Vr), comparing the feedback compensation signal (Vcomp) and the ramp signal (Vr) received thereby, and outputting a reset signal (Rm) based on a comparison result made thereby;
 a zero-current detector coupled to said inductor of said first converting circuit for detecting the current flowing therethrough, and generating an activating signal (ZCD_master) upon detecting that the current flowing through said inductor of said first converting circuit is zero;
 an RS latch having a set input coupled to said zero-current detector for receiving the activating signal (ZCD_master) therefrom, a reset input coupled to said comparator for receiving the reset signal (Rm) therefrom, a data output for outputting the first driving signal (Q_master), and an inverted data output coupled to said second control module and said reference signal generator of said phase modulating module for outputting the inverted first driving signal (Qn_master) thereto;
 a ramp generator coupled to said inverted data output of said SR latch and said comparator, receiving the inverted first driving signal (Qn_master) from said inverted data output of said SR latch, and outputting the ramp signal (Vr) to said comparator based on the inverted first driving signal (Qn_master) received thereby; and
 a driver coupled to said data output of said RS latch and said control end of said power switch of said first converting circuit, receiving the first driving signal (Q_master) from said data output of said RS latch, and outputting the first control signal to said control end of said power switch of said first converting circuit based on the first driving signal (Q_master) received thereby.

* * * * *